United States Patent [19]
Jantz

[11] Patent Number: 5,937,428
[45] Date of Patent: Aug. 10, 1999

[54] METHOD FOR HOST-BASED I/O WORKLOAD BALANCING ON REDUNDANT ARRAY CONTROLLERS

[75] Inventor: Ray M. Jantz, Wichita, Kans.

[73] Assignee: LSI Logic Corporation, Milpitas, Calif.

[21] Appl. No.: 08/906,918

[22] Filed: Aug. 6, 1997

[51] Int. Cl.⁶ ..................................................... G06F 12/02
[52] U.S. Cl. ........................... 711/114; 711/148; 711/149; 711/153; 711/163; 395/675; 395/857; 395/858; 395/859; 395/182.04
[58] Field of Search ................................. 395/675, 857, 395/858, 859, 182.04; 711/112, 114, 148, 149, 153, 163

[56] References Cited

U.S. PATENT DOCUMENTS

| | | | |
|---|---|---|---|
| 4,396,984 | 8/1983 | Videki, II | 395/858 |
| 4,435,755 | 3/1984 | Meritt | 395/858 |
| 4,633,387 | 12/1986 | Hartung et al. | 395/675 |
| 5,124,987 | 6/1992 | Milligan et al. | 371/10.1 |
| 5,274,645 | 12/1993 | Idleman et al. | 371/10.1 |
| 5,313,584 | 5/1994 | Tickner et al. | 395/857 |
| 5,454,085 | 9/1995 | Gajjar et al. | 395/285 |
| 5,459,864 | 10/1995 | Brent et al. | 395/675 |
| 5,544,339 | 8/1996 | Baba | 395/441 |
| 5,546,535 | 8/1996 | Stallmo et al. | 395/182.07 |
| 5,546,558 | 8/1996 | Jacobson et al. | 395/441 |
| 5,592,672 | 1/1997 | Grewal et al. | 395/675 |
| 5,687,390 | 11/1997 | McMillan, Jr. | 395/825 |
| 5,768,623 | 6/1998 | Judd et al. | 395/857 |
| 5,835,938 | 11/1998 | Yamamoto et al. | 711/112 |

*Primary Examiner*—Eddie P. Chan
*Assistant Examiner*—Hiep T. Nguyen
*Attorney, Agent, or Firm*—Wayne P. Bailey; Jessica J. Clement

[57] ABSTRACT

A RAID storage system which attempts to balance the I/O workload between multiple redundant array controllers is presented. The RAID storage system of the invention utilizes a plurality of redundant array controllers which require static ownership of storage devices for WRITE access requests to the same redundancy parity group. Accordingly, a plurality of storage devices are provided in the system, each of which is owned by one of the redundant array controllers. Each storage device is coupled to both its owner controller and at least one other array controller. Each array controller coupled to a storage device has the ability to read and write data from and to the storage device. Each array controller has a processing queue from which pending read and write access requests are removed and then processed one at a time by the controller. A host computer is provided for dispatching read and write access requests to the redundant array controllers. WRITE access requests are dispatched only to the owner controller of the storage device to be written to. READ access requests may be dispatched to any one of the array controllers coupled to the storage device from which data is to be read. Load balancing among the array controllers is generally achieved by dispatching READ access requests to one controller or another in an attempt to offset WRITE access requests which must be dispatched to its owner controller.

13 Claims, 7 Drawing Sheets

METHOD FOR HOST-BASED I/O WORKLOAD BALANCING ON REDUNDANT ARRAY CONTROLLERS

FIELD OF THE INVENTION

The present invention relates generally to the field of computer data storage, and more particularly to a system and method for achieving dynamic load balancing on multiple-active Redundant Arrays of Inexpensive Disks (RAID) controllers.

BACKGROUND OF THE INVENTION

Redundant Arrays of Inexpensive Disks (RAID) technology is known in the art. RAID storage systems are commonly used in high-profile industries, such as the banking and airline industries, where the inability to access certain data for even a moment, let alone its loss, can spell disaster. RAID storage systems are often referred to as "fault-tolerant" due to their ability to access data even when one or more storage devices fails. RAID storage systems accomplish this by distributing redundant copies of data across multiple storage devices. RAID technology is independent of the type of storage device used, and thus may be applied to systems which use magnetic, optical, or semiconductor disk drives, or large capacity tape drives, or a mix of different type storage devices. Several RAID architectures exist for providing redundant access of data. The particular RAID architecture used mandates both the format of the data across the multiple storage devices and the way in which the redundant data is accessed. RAID architectures are categorized in levels ranging from 1–5 according to the architecture of the storage format.

In a level 1 RAID storage system, a duplicate set of data is stored on pairs of "mirrored" storage devices. Accordingly, identical copies of data are stored to each storage device in each pair of mirrored storage devices. The RAID 1 level storage system provides absolute redundancy and therefore high reliability, but it requires twice the storage space. This method is therefore costly and space-consuming.

In a level 2 RAID storage system, each bit of each word or data, plus Error Detection and Correction (EDC) bits for each word, are stored on separate storage devices. Thus, in a 32-bit word architecture having 7 EDC bits, 39 separate storage devices are required to provide the redundancy. In this example, if one of the storage devices fails, the remaining 38 bits of each stored 39-bit word can be used to reconstruct each 32-bit word on a word-by-word basis as each data word is read from the storage devices, thereby obtaining fault tolerance. Although the redundancy is achieved not by duplicating the data but by reconstructing the accessible data, and therefore less actual storage space is required to achieve redundancy, the level 2 RAID storage system has the disadvantage that it requires one storage device for each bit of data and EDC, which can amount to a very large and costly system.

In a level 3 RAID storage system, each storage device itself includes error detection means. This is often achieved using a custom-designed Application Specific Integrated Circuit (ASIC) within the storage device itself that is designed to provide built-in hardware error detection and correction capabilities. Level 3 RAID systems accordingly do not need the more sophisticated multiple EDC bits, which allows a simpler exclusive-or parity checking scheme requiring only one bit to be used to generate parity information. Level 3 RAID storage systems thus only require one storage device to store parity information, which, in combination with each of the data bit storage devices, may be used to recover the accessible bits and reconstruct inaccessible data.

In the level 2 and 3 RAID storage systems, each bit of the data and parity is transferred to and from each respective distributed storage device in unison. In other words, this arrangement effectively provides only a single read/write head actuator for the entire storage device. For large files, this arrangement has a high data transfer bandwidth since each individual storage device actuator transfers part of a block of data, which allows an entire block to be accessed much faster than if a single storage device actuator were accessing the block. However, when the data files to be accessed are small, the random access performance of the drive array is adversely affected since only one data file at a time can be accessed by the "single" actuator.

A level 4 RAID storage system employs the same parity error correction scheme as the level 3 RAID architecture, but essentially decouples the individual storage device actuators to improve on the performance of small file access by reading and writing a larger minimum amount of data, such as a disk sector rather than a single bit, to each disk. This is also known as block striping. In the level 4 RAID architecture, however, writing a data block on any of the independently operating storage devices also requires writing a new parity block on the parity unit. The parity information stored on the parity unit must be read and XOR'd with the old data (to "remove" the information content of the old data), and the resulting sum must then be XOR'd with the new data (to "add" the new parity information). Both the data and the parity records must then be rewritten to the disk drives. This process is commonly referred to as a "Read-Modify-Write" (RMW) operation. Thus, a READ and a WRITE on the single parity storage device occurs each time a record is changed on any of the storage devices covered by a parity record on the parity storage device. The parity storage device becomes a bottleneck to data writing operations since the number of changes to records which can be made per unit of time is a function of the access rate of the parity storage device, as opposed to the faster access rate provided by parallel operation of the multiple storage devices.

A level 5 RAID storage system is similar to the level 4 RAID architecture in its parity error correction scheme and in its decoupling of the individual storage device actuators, but improves upon the performance of WRITE accesses by distributing the data and parity information over all of the available storage devices in a circular fashion. Accordingly, the number of WRITE operations which can be made per unit of time is no longer a function of the access rate of a single parity storage device because the parity information is distributed across all the storage devices. Typically, "N+1" storage devices in a set, or "redundancy group", are divided into a plurality of equally sized address areas referred to as blocks. Each storage device generally contains the same number of blocks. Blocks from each storage device in a redundancy group having the same unit address ranges are referred to as "stripes". Each stripe has N blocks of data, plus one parity block on one storage device containing parity for the N data blocks of the stripe. Further stripes each have a parity block, the parity blocks being distributed on different storage devices. Parity updating activity associated with every modification of data in a redundancy group is therefore distributed over the different storage devices. No single storage device is burdened with all of the parity update activity, and thus the parity storage device access bottleneck is diffused. For example, in a level 5 RAID system comprising five storage devices, the parity information for the first stripe of blocks may be written to the fifth drive; the parity information for the second stripe may be written to the fourth drive; the parity information for the third strip may be written to the third drive, and so on. The parity block for succeeding stripes typically circles around the storage devices in a helical pattern.

The RAID storage systems described above all handle the problem of providing access to redundant data if one or more storage devices fail. However, prior art RAID storage systems provided only one storage device array controller. In such a system, if the controller fails, data is inaccessible regardless of the RAID architecture level, so storage of redundant data is rendered moot.

One solution to this problem is to provide redundant storage device controllers. In RAID storage systems which have redundant controllers, generally only one controller (i.e., the "primary controller") is active for accessing a particular logical volume at a time. Any additional controllers (i.e., "secondary controllers"), operate in a "standby" mode for that particular logical volume. If the primary controller for the particular logical volume fails, one of the secondary controllers takes over to perform accesses for the particular logical volume. Generally, in level 4 and 5 RAID storage systems, only the primary controller is active for a particular logical volume due to the necessity for serializing WRITE operations to the same parity group. Level 4 and 5 RAID storage systems employ the read-modify-write (RMW) method to maintain accurate parity for reconstructing the data. If WRITE operations to the same parity group in these level 4 and 5 RAID storage systems are not serialized, controller collisions, which occur when more than one controller attempts to write data within the same parity group, may cause invalid parity to be generated. Invalid parity results in data which cannot be reconstructed.

FIG. 1 illustrates a controller collision which results in invalid parity. As shown in FIG. 1, four storage devices 1–4 in a RAID storage system respectively store three data blocks 11–13 and a parity block 14, together comprising a single redundancy group. Data block 11 has the value "001"; data block 12 has the value "010"; data block 13 has the value "100"; and parity block 14 has the value "111", which is the exclusive-OR of each of the data values in data blocks 11–13. In the collision example of FIG. 1, the RAID storage system utilizes a primary array controller 20 and a secondary array controller 30. To illustrate the collision, it will be assumed that the primary controller is writing a new value "100" to data block 11 during the time that the secondary array controller is writing a new value "110" to data block 12. A write to a data block requires not only the data to be written to the appropriate data block, but that a read-modify-write (RMW) operation be performed on the associated parity block (i.e., the parity block must be read, updated by removing the old data content and adding the new data content, and then written back to the parity storage device). Accordingly, primary array controller 20 reads the old data value "001" from the data block 11 into an old data register 21 and the old parity value "111" from the parity block 14 into an old parity register 22. The data content is then "removed" from the old parity by performing an exclusive-OR on the old data value stored in the old data register 21 and the old parity value stored in the old parity register 22. The resulting value "110" of the exclusive-OR calculation is stored in a "removed" parity register 23. The new data value "100" is stored in a new data register 24. A new parity value is then calculated by performing an exclusive-OR on the "removed" parity value and the new data value, and the resulting value "010" is then stored in a new parity register 25.

If, during the time that the primary array controller 20 is calculating a new parity value for data block 11, the secondary array controller 30 performs a WRITE operation to a data block in the same redundancy group, it is possible that the RMW operation for updating the parity will collide with the RMW operation by the primary array controller 20. The problem is illustrated in FIG. 1, where the secondary array controller is writing a new value "110" to data block 12. Accordingly, secondary array controller 30 reads the old data value "010" from the data block 12 into an old data register 31 and the old parity value "111" from the parity block 14 into an old parity register 32. The data content is then "removed" from the old parity by performing an exclusive-OR on the old data value stored in the old data register 31 and the old parity value stored in the old parity register 32. The resulting value "101" of the exclusive-OR calculation is stored in a "removed" parity register 33. The new data value "110" is stored in a new data register 34. A new parity value is then calculated by performing an exclusive-OR on the "removed" parity value and the new data value, and the resulting value "011" is then stored in a new parity register 25.

As will be appreciated from the above description of the RMW operations by the primary and secondary controllers, one or the other controller must complete its RMW operation before the other controller can begin its RMW operation. Otherwise, the array controller that performs the RMW operation before the other controller has finished the write portion of the RMW operation will read a parity value that is no longer valid, resulting in the propagation of invalid parity values from that point on. Accordingly, prior art RAID storage systems which have redundant array controllers either allow only one controller to operate at a time, such as utilizing only the primary array controller unless it fails and only then utilizing the secondary controller, or by statically binding each storage device to one array controller or another and allowing WRITEs to any given storage device to be controlled only by the array controller which owns it.

The redundant controller schemes of the prior art are problematic. Since one or more array controller resources remain idle unless the primary controller fails, the RAID storage system can never operate at full capacity. Indeed, these idle resources essentially limit the I/O bandwidth of the RAID storage system to half or less. One solution to this problem includes modifying the array controllers to be aware of each other's RMW operations and to schedule accordingly. However, this solution adds complexity and expense to the current controllers in the industry. It would be desirable to provide a system and method for achieving dynamic load balancing of READ and WRITE access requests across multiple redundant array controllers to increase the I/O bandwidth without modifying the current controllers.

SUMMARY OF THE INVENTION

The present invention achieves this goal. A system and method is presented for balancing the I/O workload in a RAID storage system between redundant array controllers which require strict storage device ownership constraints for WRITE access requests to the same parity redundancy group. The load balancing is achieved by relaxing the rigid ownership constraints for READ access requests to allow any controller that is coupled to the storage device from which the data is to be read to control the read operation from the storage device. On WRITE access requests, the rigid ownership constraints of the controllers, which require only the owner controller of a storage devices to which data is to be written, are maintained, and thus only the owner controller of a storage device may control write operations to the storage device. According to the method of the invention, WRITE access requests are dispatched to the owner controller of the storage device to be written to, and READ access requests are dispatched to the controller having the fewest number of READ or WRITE access requests pending in its processing queue. The invention results in a more even workload balance among each of the controllers.

The RAID storage system of the invention includes a plurality of redundant array controllers, each of which has a corresponding processing queue for retrieving pending read and write access requests that are to be processed by the corresponding array controller. The RAID storage system also includes a plurality of storage devices. Each storage device is owned by an owner controller which is one of the plurality of array controllers. Each storage device is coupled to two or more of the plurality of array controllers. Each array controller that is coupled to a given storage device has the ability to read and write to the given storage device. One array controller that is coupled to a given storage device is designated as the owner controller for write accesses to that device, and accordingly will perform all write accesses to that device unless it fails. Only when the owner controller of a given storage device fails, will one of the other controllers coupled to that storage device perform a write access to it. A host computer dispatches read and write access requests to the plurality of array controllers. A WRITE access request is only dispatched to the owner controller of the storage device to be written to. A READ access request may be dispatched to any one of the two or more array controllers coupled to the storage device to be read from. The host computer attempts to dynamically balance the read/write access request workload across the array controllers.

Generally, the dispatcher operates to offset WRITE access requests which must be processed by its owner controller by dispatching READ access requests to the controller which has the lowest pending activity in its processing queue and which is coupled to the storage device that is to be read from. Accordingly, upon receipt of a read access request of data on a given storage device, if one or more write access requests are currently on the processing queue of the storage device's owner controller, the read access request is dispatched to one of the other array controllers which are coupled to the storage device in order to offset the write access requests which must be processed by the owner controller. Generally this is done by dispatching a READ access request to the array controller which is coupled to the storage device that is to be read from which has a fewest total number of read and write access requests in its corresponding processing queue. In a more complex yet more accurate load balancing embodiment, a write weight is assigned to write access requests and a read weight is assigned to read access requests such that, upon receipt of a read access request of data on a given storage device, the read access request is dispatched to the array controller coupled to the storage device which is to be read from which has a lowest total weight value in its corresponding processing queue.

It will be appreciated from the examples of FIGS. 4(a)–(e) that the I/O bandwidth of the RAID storage system depends upon the pattern of the I/O access requests received by the dispatcher 112 and the timing in which it is received. With the workload balancing technique of the present invention, the I/O bandwidth will approach 100% as often as the timing and patterns of the input I/O access requests will allow. Although the 50% I/O bandwidth may still be seen, it is a worst-case parameter which exists only when a continuous block of WRITE access requests to storage devices owned by the same controller is received by the dispatcher 112, and that it only exists during that time period. Accordingly, it will be appreciated that the present invention improves the overall system I/O bandwidth of a RAID storage system which employs redundant array controllers that require strict ownership of storage devices for WRITE access requests to the same parity redundancy group.

BRIEF DESCRIPTIONS OF THE DRAWINGS

The objects and advantages of the invention will become more apparent and more readily appreciated from the following detailed description of the presently preferred exemplary embodiment of the invention taken in conjunction with the accompanying drawings, of which:

FIGS. 4(a)–(e) are illustrative diagrams which show example I/O bandwidths achieved by the RAID storage system of the present invention during a specified time period given various input access requests.

Figure 5:
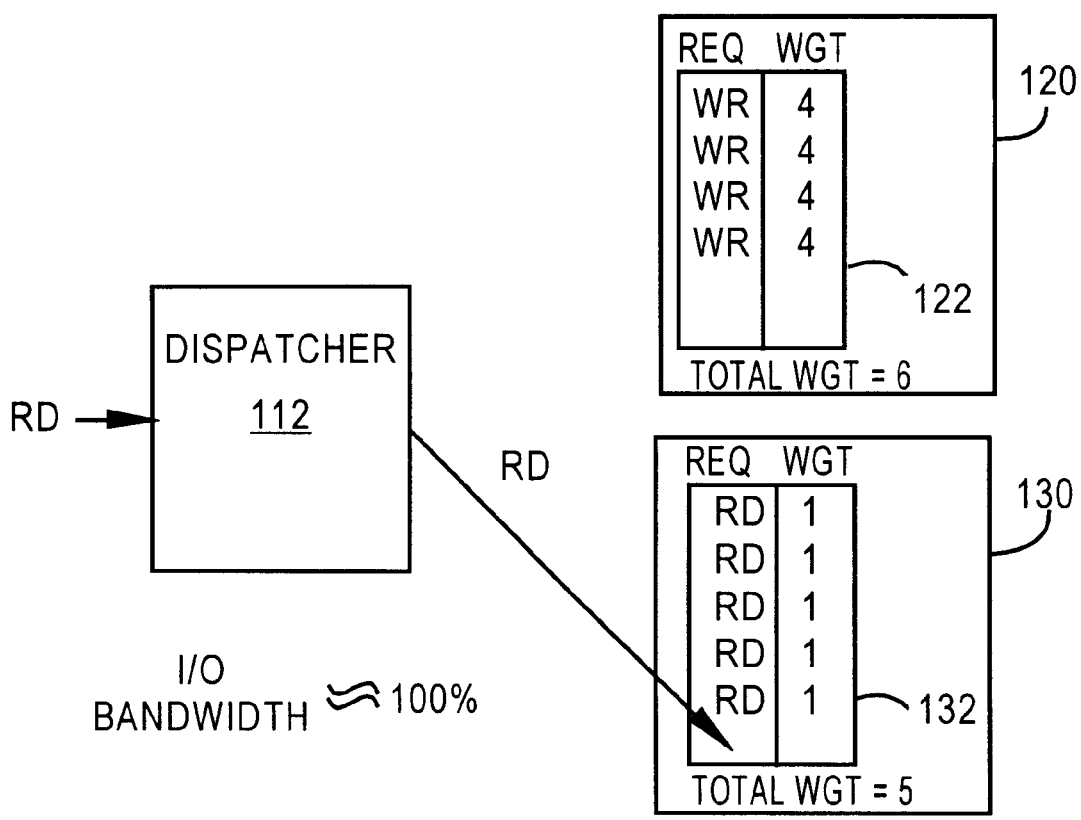

FIG. 5 is an illustrative diagram of the operation of the second embodiment of the present invention, which weights the READ and WRITE requests in proportion to their respective execution times.

DETAILED DESCRIPTION OF THE PRESENT INVENTION

Figure 1:
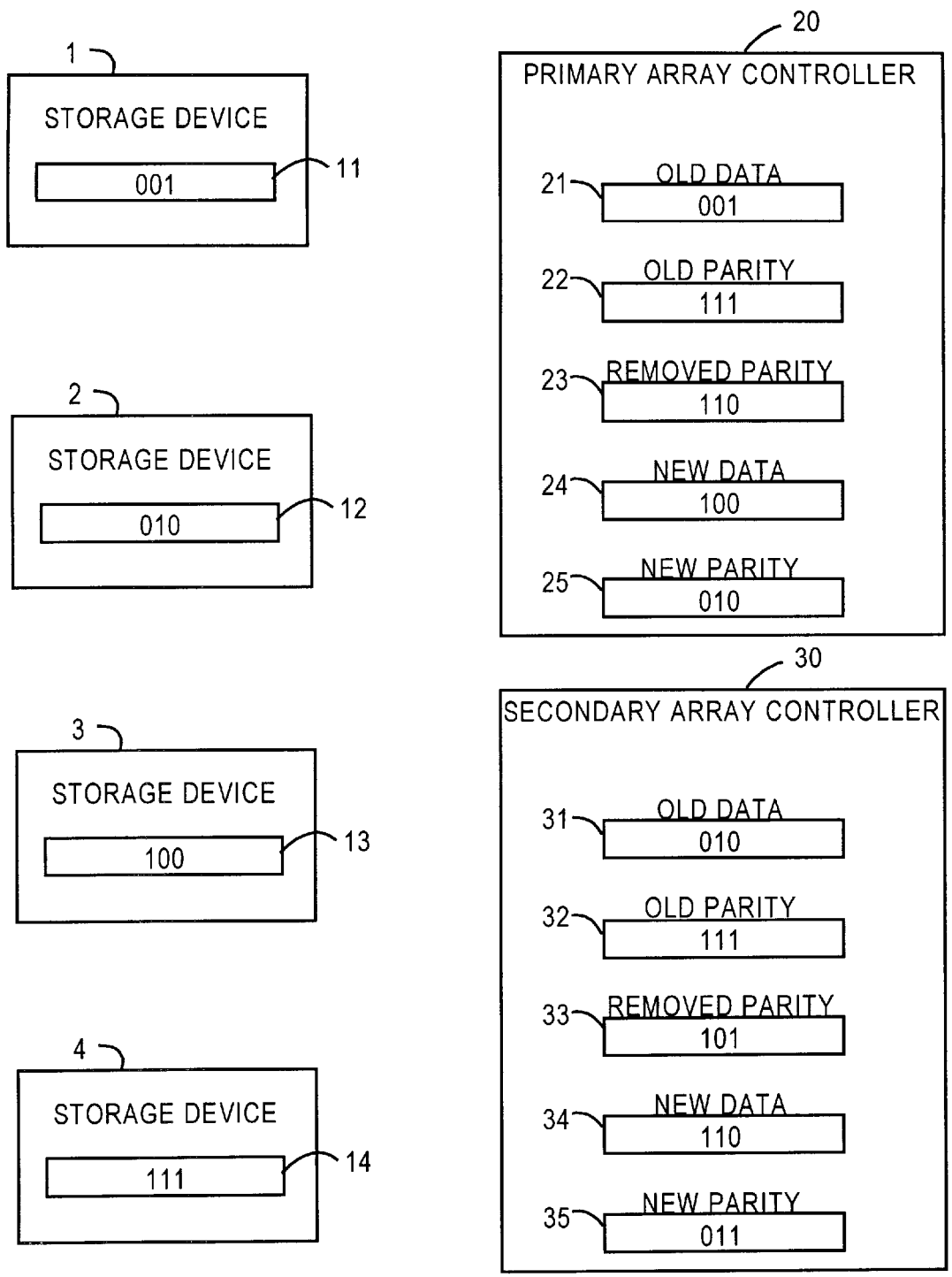
FIG. 1 is a block diagram illustrating a controller collision due to writes to storage devices in the same parity redundancy group.
Figure 2:
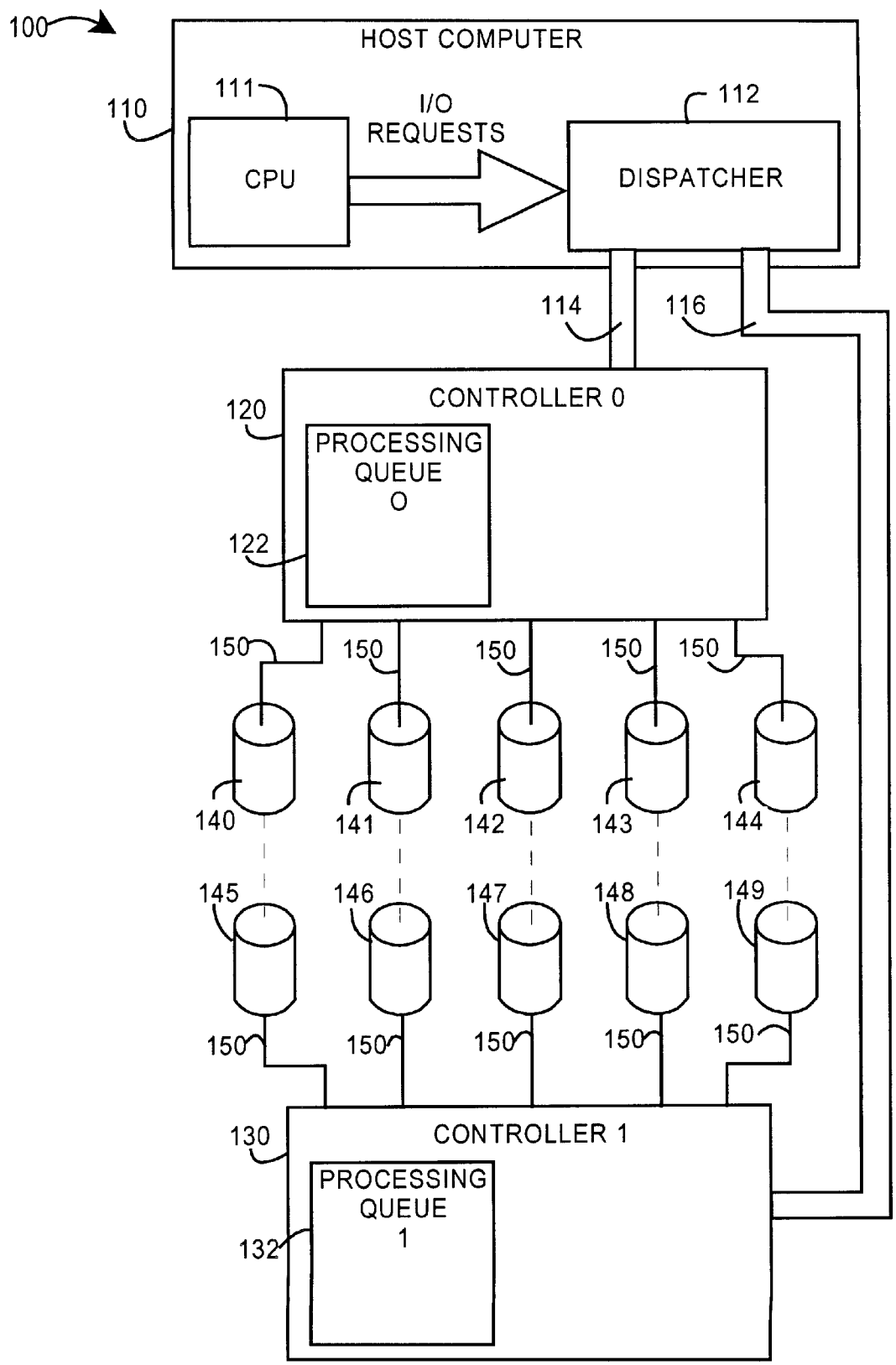
FIG. 2 is block diagram of a RAID storage system which incorporates the present invention.

FIG. 2 illustrates a RAID storage system 100 in accordance which the present invention. As shown in FIG. 2, a host computer 110 communicates with a pair of redundant array controllers 120, 130 via respective busses 114, 116. Each of the redundant array controllers 120, 130 are coupled to a plurality of storage devices 140–149 by a multiplicity of channels 150. In the preferred embodiment, the controllers are implemented using Symbios Logic Series 3 and Series 4 controllers. Each of the channels 150 is a multi-user bus, such as a Peripheral Component Interface (PCI) or Small Computer Systems Interface (SCSI) bus. While ten storage devices 140–149 are shown for illustrative purposes, the broken lines between the storage devices 140–149 indicate that a multiplicity of other storage devices may be present in the invention. A single one of the data channels 150 couples each of the storage devices in a single column (for example, 140 and 145; 141 and 146; 142 and 148; etc.) to each other and to the two redundant array controllers 120, 130.

Inside the host computer 110 resides a read/write access request dispatcher 112. The dispatcher 112 receives RD/WR access requests from a CPU 111 and dispatches the requests to one or the other controller 120 or 130. Each controller 120, 130 processes pending read or write access requests one at a time from its own respective processing queue. The processing queue for each controller may reside on the host computer 110, or alternatively may be maintained and managed within each respective controller 120, 130. In the preferred embodiment, each controller 120, 130 maintains its own respective processing queue 122, 132.

The dispatcher 112 monitors the number of pending read and write access requests present on each processing queue of each controller and attempts to balance the requests evenly between the two controllers 120, 130 in order to maximize the I/O bandwidth of the RAID storage system 100. In order to allow the use of less complex but less expensive type controllers that are currently in use in the industry and which require static ownership of storage devices by the controllers, the dispatcher 112 maintains the rigid constraint of static storage device redundancy group ownership for WRITE operations. This prevents RMW collisions of the parity when writing to the same redundancy group, while at the same time sparing the controller implementation the complexities of having to coordinate concurrent parity group access by both controllers.

The dispatcher 112 attempts to balance the load of READ and WRITE requests between the controllers 120, 130 by relaxing the rigid constraint of static redundancy group ownership for READ operations. Accordingly, the dispatcher 112 may dispatch a READ access request to one controller or the other. The load balance between the controllers is achieved differently depending on the method used to distribute the read access requests between the available controllers. The method used to implement the load balancing may vary and is not intended to be limited to the embodiments disclosed herein. However, in one preferred embodiment, read access requests are dispatched to the controller having the fewest read and write access requests pending in its processing queue. This allows the dispatcher 112 to dispatch READ access requests to either controller so that WRITE access requests which are required to be on a given controller may be offset by dispatching READ access requests to the other controller.

Figure 3:
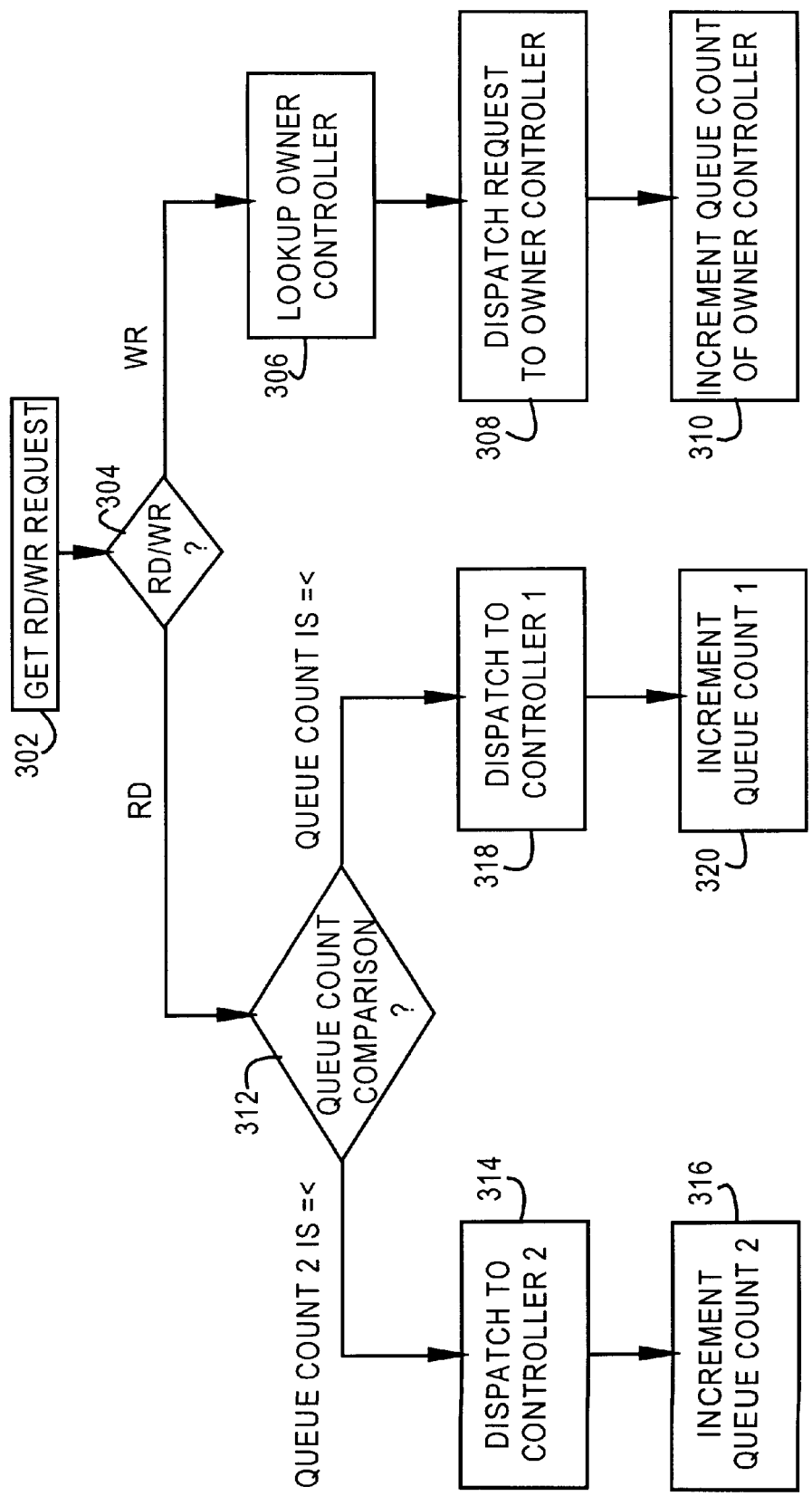
FIG. 3 is a flowchart of the method of the preferred embodiment of the present invention.

FIG. 3 is a flowchart of the method of the preferred embodiment of the present invention. As shown in FIG. 3, the dispatcher 112 receives a read or write (RD/WR) access request in a first step 302. The type of request is decoded in a step 304. If the request is a WRITE, the dispatcher 112 determines in a step 306 which controller 120, 130 is mapped to own the storage device to which the data will be written. The WRITE access request is then dispatched to the owner controller in step 308, and the queue count of the processing queue associated with the owner controller is incremented in step 310. (The queue count is decremented each time the associated controller processes a READ or WRITE access request from its processing queue).

If the type of request is decoded in step 304 to be a READ, the dispatcher 112 determines which controller has a smaller queue count in a step 312. If controller 120 has fewer READ/WRITE access requests pending in its processing queue, the dispatcher 112 dispatches the READ access request to controller 120 in step 314, and increments the queue count of processing queue 122 in a step 316. If controller 130 has fewer READ/WRITE access requests pending in its processing queue, the dispatcher 112 dispatches the READ access request to controller 130 in step 318, and increments the queue count of processing queue 132 in a step 320. (Again, the queue count of each processing queue is decremented each time the associated controller processes a READ or WRITE access request from its processing queue).

An example dispatch routine which may be used to implement the dispatcher 112 of FIG. 2 is given in Table 1 below:

TABLE 1

```
dispatch(io_request.storage_device)
    begin
        if (io_request == WRITE) then
            ctlr = owner controller of storage device
        end
        if (io_request == READ) then
            ctlr = controller with fewest pending READ/WRITE
                access requests
        end
        dispatch io_request.storage_device to ctlr
        increment queue count for processing queue of ctlr
    end
```

Using the dispatch routine of Table 1, the I/O capacity of the RAID storage system 100 will vary from 50% to 100% depending on the ratio of READ access requests to WRITE access requests on the same redundancy group. For 100% READ access requests, the dispatcher 112 will evenly divide the READ access requests between the two controllers 120, 130. For 100% WRITE access requests, the dispatcher 112 will dispatch all WRITE access requests to the owner controller. For a mix of READ and WRITE access requests, the READs will be directed as much as possible to one controller so as to offset the WRITE access requests on the other controller.

FIGS. 4(a)–(e) illustrate example I/O bandwidths achieved by the RAID storage system 100 during a specified time period given various input access requests. It will be noted that under normal operation, large bursts of data are typically read or written. The examples shown in FIGS. 4(a)–(e), which show only a few reads or writes requested at a time, are for illustrative purposes only.

Figure 4A:
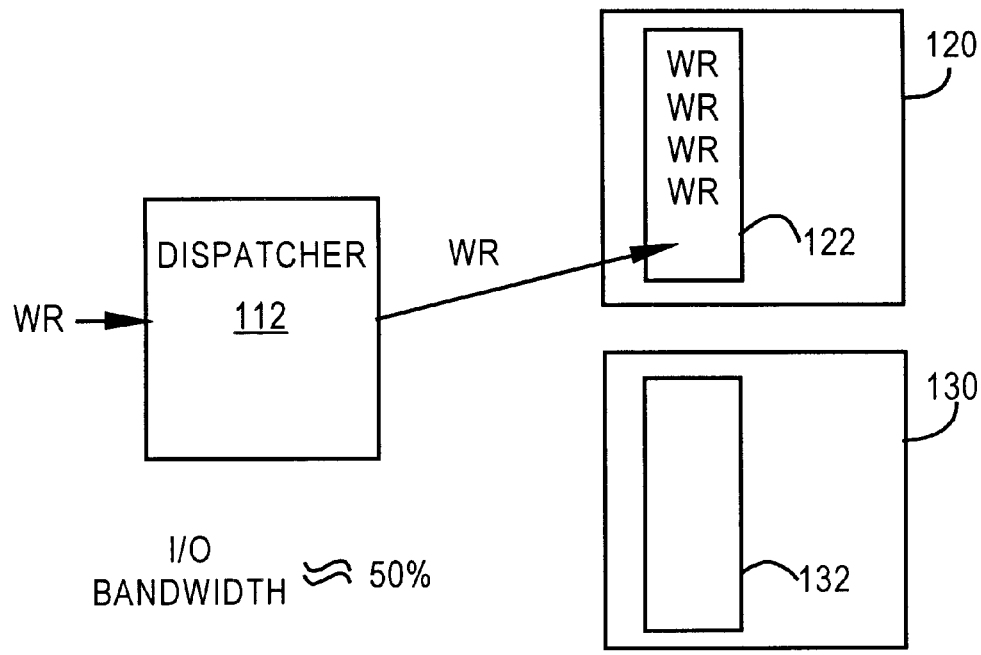

In FIG. 4(a), controller 120 owns all of the storage devices to which data is to be written. During the selected period, four WRITE access requests have been processed and dispatched to the owner controller 120, and are shown pending on its processing queue 122. When a fifth WRITE access request is received by the dispatcher 112, it is dispatched to the owner controller of the storage device to which the data is to be written—in this example, controller 120. Accordingly, it will be appreciated that during this time period, the I/O bandwidth of the RAID storage system 100 will be only 50% since all of the workload is handled by the single controller 120 while controller 130 remains idle.

Figure 4B:
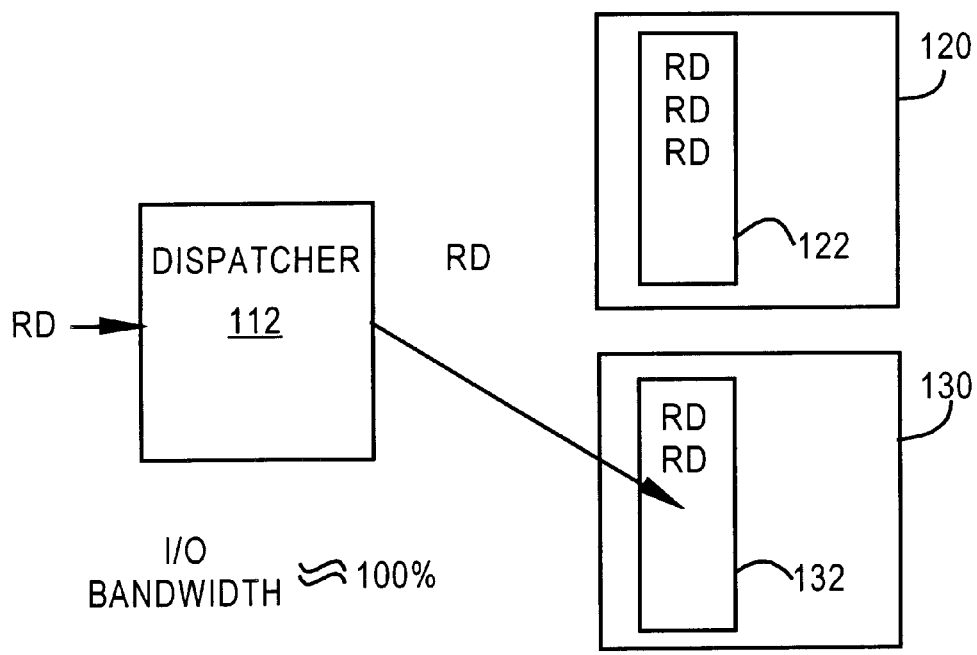

In FIG. 4(b), only READ access requests are received by the dispatcher. In this example, the data to be read may be read from any storage device. During the selected period, five READ access requests have been processed and dispatched evenly between controller 120 and controller 130, and are shown pending on their respective processing queues 122, 123. When the fifth READ access request came in, both controllers 120 and 130 had equal numbers of pending access requests in their respective processing queues 122, 132, so the dispatcher was free to dispatch the fifth READ access request to either controller. FIG. 4(b) shows the fifth READ access request as dispatched to controller 120. Accordingly, when a sixth READ access request is received by the dispatcher 112, as illustrated in FIG. 4(b), it is dispatched to the controller having the fewest number of pending access requests in its processing queue, which in this example is controller 130. Accordingly, it will be appreciated that during this time period, the I/O bandwidth of the RAID storage system 100 will approach 100% since the entire workload is distributed evenly across both controllers 120 and 130, and neither remains idle.

Figure 4C:
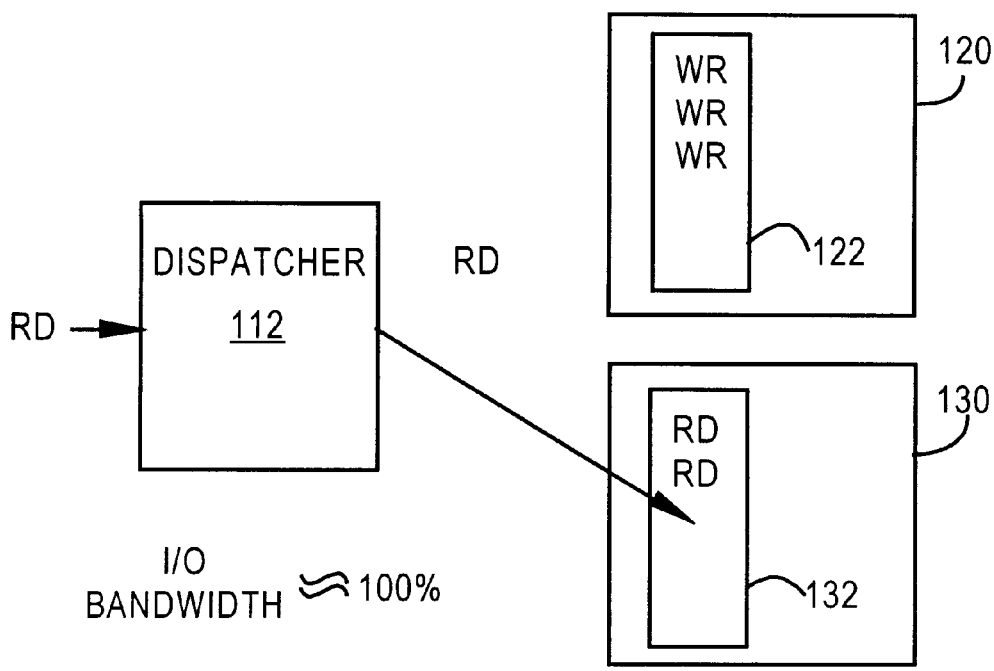

In FIG. 4(c), three WRITE access requests are received by the dispatcher and dispatched to their owner controller—in this example, controller 120. Two READ access requests are received by the dispatcher and dispatched to the opposite controller 130 in an attempt to offset the WRITE access requests which are required to be processed by their owner controller 130. The three WRITE access requests and two READ access requests received during the selected period are shown pending on their respective processing queues 122, 123. When a READ access request is received next by the dispatcher 112, controller 120 has more access requests in its processing queue 122 than controller 130 has in its processing queue 132, so the dispatcher dispatches the READ access request to controller 130. Accordingly, it will be appreciated that during this time period, the I/O bandwidth of the RAID storage system 100 can approach 100% since the entire workload is distributed evenly across both controllers 120 and 130, and neither remains idle.

Figure 4D:
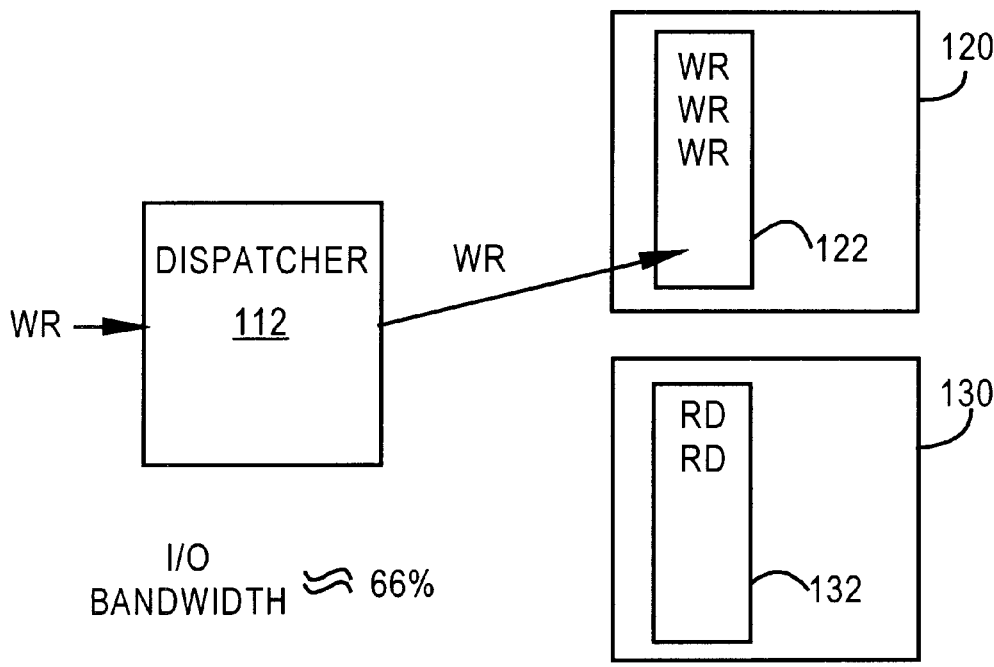

In FIG. 4(d), three WRITE access requests are received by the dispatcher and dispatched to their owner controller—in this example, controller 120. Two READ access requests are received by the dispatcher and dispatched to the opposite controller 130 in an attempt to offset the WRITE access requests which are required to be processed by their owner controller 130. The three WRITE access requests and two READ access requests received during the selected period are shown pending on their respective processing queues 122, 123. When a WRITE access request is received next by the dispatcher 112, the dispatcher 112 must dispatch it to its owner controller—in this example, controller 130—even though controller 130 has fewer access requests in its processing queue 132 than does controller 130 in its processing queue 132. Accordingly, it will be appreciated that during this time period, the I/O bandwidth of the RAID storage system 100 will not be 100%, since the more of the workload is distributed to controller 120 than to 130. However, it will also be appreciated that the I/O bandwidth is still well above 50%—in this example approximately 66%—and neither controller remains entirely idle.

Figure 4E:
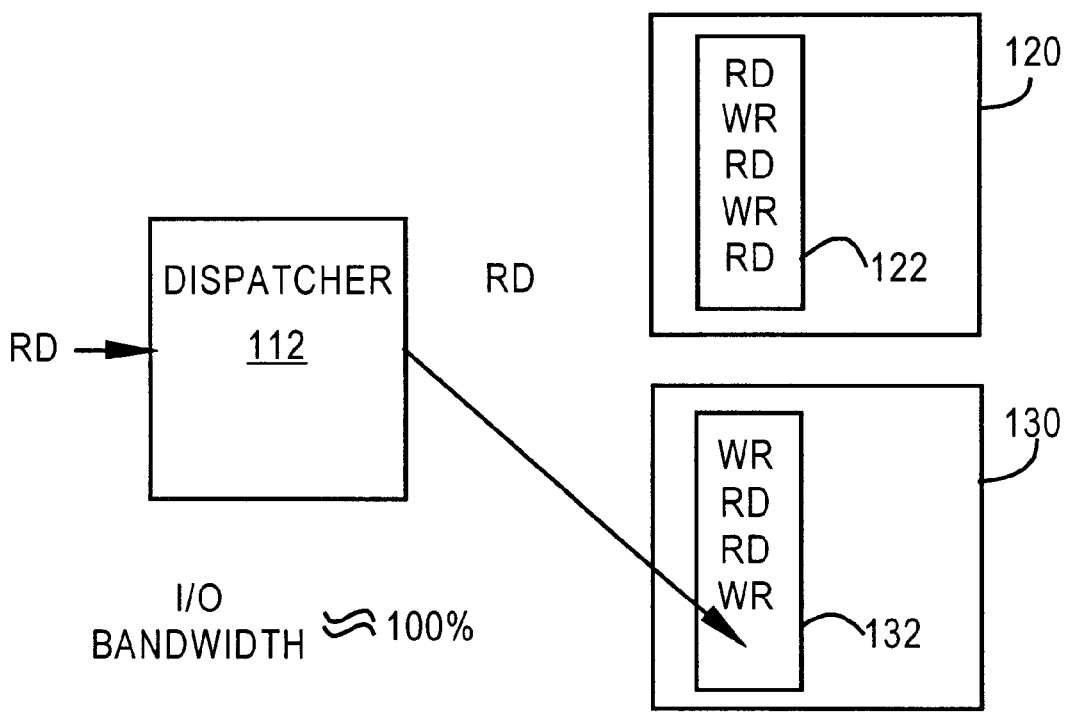

In FIG. 4(e), controller 120 has the following access requests pending in its queue in order: READ, WRITE, READ, WRITE, READ. Controller 130 has the following access requests pending in its queue in order: WRITE, READ, READ, WRITE. When a READ access request is received next by the dispatcher 112, controller 120 has more access requests in its processing queue 122 than controller 130 has in its processing queue 132, so the dispatcher dispatches the READ access request to controller 130. Accordingly, it will be appreciated that during this time period, the I/O bandwidth of the RAID storage system 100 can approach 100% since the entire workload is distributed evenly across both controllers 120 and 130, and neither remains idle.

It will be appreciated from the examples of FIGS. 4(a)–(e) that the I/O bandwidth of the RAID storage system depends upon the pattern of the I/O access requests received by the dispatcher 112 and the timing in which it is received. With the workload balancing technique of the present invention, the I/O bandwidth will approach 100% as often as the timing and patterns of the input I/O access requests will allow. Although the 50% I/O bandwidth may still be seen, it is a worst-case parameter which exists only when a continuous block of WRITE access requests to storage devices owned by the same controller is received by the dispatcher 112, and that it only exists during that time period. Accordingly, it will be appreciated that the present invention improves the overall system I/O bandwidth of a RAID storage system which employs redundant array controllers that require strict ownership of storage devices for WRITE access requests to the same parity redundancy group.

In an alternative preferred embodiment, weights can be assigned to the WRITE access requests in recognition of the fact that they place a heavier resource demand on the controller due to RAID RMW requirement for write operations. In other words, since a WRITE access request involves a read from and a write to the parity for the redundancy group, it requires more time to execute. Consequently, it may be desirable to account for this when assigning READ access requests to one controller or another. By assigning a heavier weight to a WRITE operation, the dispatcher 112 can tally the weights of pending access requests, rather than the number of pending READ/WRITE access requests, on each controller to determine which controller has a lighter load.

FIG. 5 illustrates the benefit of the second preferred embodiment. As shown in FIG. 5, READ access requests are assigned a 1× weight value and WRITE access requests are assigned a 4× weight to account for the fact that for this example a WRITE operation hypothetically requires 4 times the time it takes to execute a READ operation (since a WRITE access request in a level 4 or 5 RAID system requires a READ of old data, a READ of old parity, a WRITE of new data, and a WRITE of new parity). Accordingly, as shown in FIG. 5, when a READ access request is received by the dispatcher 112, it compares the tally of all outstanding weight values between controller 120 and controller 130. As shown in FIG. 5, controller 120 has a higher total outstanding weight than controller 130, even though it has a fewer number of pending READ and WRITE access requests. Accordingly, the READ access request is dispatched to controller 130. This second preferred embodiment is slightly more complex than the first preferred embodiment, but it will be appreciated that the weight assignment to READ and WRITE access requests more accurately balances the I/O load, which results in a higher capacity I/O bandwidth between the host computer 110 and the RAID storage.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A storage system comprising:
    a plurality of array controllers for controlling read and write access requests, at least two of said array controllers each having a corresponding processing queue for placing pending read and write access requests to be processed by said corresponding array controller;
    a plurality of storage devices, at least one given storage device among said plurality of storage devices mapped to be owned by an owner controller among said at least two array controllers and coupled to a plurality of coupled array controllers which comprise both its owner controller and at least one other of said at least two array controllers; and
    a host computer for dispatching read and write access requests to said at least two array controllers, wherein a write access request for writing data to said given storage device is only dispatched to and processed by its owner controller if said owner controller is in a non-failure mode, and a read access request for reading data from said given storage device may be dispatched to any one of its plurality of coupled array controllers.

2. The storage system of claim 1, wherein said host computer attempts to dynamically balance a read/write access request workload among said at least two array controllers.

3. The storage system of claim 2, wherein said host computer attempts to achieve said dynamic balance of said workload by offsetting write access requests dispatched to one of said at least two array controllers with read access requests dispatched to others of said at least two array controllers.

4. The storage system of claim 1, wherein, upon receipt of a read access request of data on said given storage device, said read access request is dispatched to one of its coupled array controllers which has a fewest total number of read and write access requests in its corresponding processing queue.

5. The storage system of claim 1, wherein a write weight is assigned to write access requests and a read weight is assigned to read access requests such that, upon receipt of a read access request of data on said given storage device, said read access request is dispatched to a one of its coupled array controllers which has a lowest total weight value in its corresponding processing queue.

6. A method for balancing a read/write access request workload among redundant array controllers in a storage system comprising a plurality of array controllers, at least two of said array controllers each having a corresponding processing queue for placing pending read and write access requests to be processed by said corresponding array controller; a plurality of storage devices, at least one given storage device among said plurality of storage devices mapped to be owned by an owner controller among said at least two array controllers and coupled to a plurality of coupled array controllers which comprise both its owner controller and at least one other of said at least two array controllers, said method comprising the steps of:

(a) requiring a write access request for writing data to said given storage device to be dispatched only to its owner controller if said owner controller is in a non-failure mode; and (b) allowing a read access request for reading data from said given storage device to be dispatched to any one of its coupled array controllers.

7. The method of claim 6, wherein step (b) further comprises the step of:

(b)(i) dispatching write access requests and read access requests in an attempt to dynamically balance a workload across said at least two array controllers.

8. The method of claim 7, wherein step (b) further comprises the step of:

(b)(ii) achieving said dynamic balance of said workload by offsetting write access requests dispatched to one of said at least two array controllers with read access requests dispatched to others of said at least two array controllers.

9. The method of claim 6, wherein step (b) further comprises the step of:

(b)(iii) dispatching said read access request to a coupled array controller which has a fewest total number of write and read access requests in its processing queue.

10. The method of claim 6, wherein step (a) comprises a first step of:

(a)(i) assigning a weighted write value to said write access request; and wherein step (b) comprises the steps of:

(b)(i) assigning a weighted read value to said read access request.

11. The method of claim 10, wherein step (b) further comprises the step of:

(b)(iv) dispatching said read access request to a coupled array controller which has a lowest total weight value in its processing queue.

12. A method for balancing a read/write access request workload among redundant array controllers in a storage system comprising a plurality of array controllers, at least two of said array controllers each having a corresponding processing queue for placing pending read and write access requests to be processed by said corresponding array controller; a plurality of storage devices, at least one given storage device among said plurality of storage devices mapped to be owned by an owner controller among said at least two array controllers and coupled to a plurality of coupled array controllers which comprise both its owner controller and at least one other of said at least two array controllers, said method comprising the step of:

(a) maintaining rigid ownership constraints for a write access request to a given storage device such that only said owner controller of said given storage device may control write operations to said give storage device;

(b) relaxing said rigid ownership constraints for a read access request from said given storage device such that any coupled controller that is coupled to said given storage device may control read operations from said storage device.

13. The method of claim 12, further comprising the step of:

(c) dispatching said write access request to said owner controller and dispatching said read access request to one of said coupled controllers which results in a substantially balanced workload across said coupled controllers.

* * * * *